(12) United States Patent
Prud'Homme

(10) Patent No.: US 6,802,376 B2
(45) Date of Patent: Oct. 12, 2004

(54) HORSESHOE WITH SPIKES AND METHOD FOR MAKING THE SPIKES

(76) Inventor: Regis Prud'Homme, 860 Guérin, Saint-Michel-de-Napierville, Quebec (CA), J0L 2J0

( * ) Notice: Subject to any disclaimer, the term of this patent is extended or adjusted under 35 U.S.C. 154(b) by 65 days.

(21) Appl. No.: 10/401,627

(22) Filed: Mar. 28, 2003

(65) Prior Publication Data

US 2003/0183399 A1 Oct. 2, 2003

Related U.S. Application Data

(60) Provisional application No. 60/367,755, filed on Mar. 28, 2002.

(51) Int. Cl.$^7$ .............................................. A01L 1/00
(52) U.S. Cl. ............................................. 168/4; 168/24
(58) Field of Search ................................ 168/4, 24, 17, 168/29, 41

(56) References Cited

U.S. PATENT DOCUMENTS

| | | | |
|---|---|---|---|
| 167,027 A | * 8/1875 | Seymour | 168/29 |
| 514,011 A | * 2/1894 | Kinnear | 168/29 |
| 624,650 A | * 5/1899 | Hearst | 168/29 |
| 740,623 A | * 10/1903 | Bradley et al. | 168/24 |
| 766,039 A | * 7/1904 | Hoffman | 168/29 |
| 876,265 A | * 1/1908 | Campbell | 168/4 |
| 879,790 A | * 2/1908 | McGeighan | 168/4 |
| 1,035,969 A | * 8/1912 | Kiefer | 168/29 |
| 4,420,046 A | 12/1983 | Choplin | |
| 4,878,541 A | 11/1989 | Pedersen | 168/4 |
| 4,889,188 A | 12/1989 | Anderson | 168/13 |
| 5,158,143 A | 10/1992 | Campbell | 168/4 |
| 5,172,766 A | 12/1992 | Adkins | 168/14 |
| 5,205,362 A | 4/1993 | Noffsinger | 168/13 |
| D367,739 S | 3/1996 | Fox et al. | D30/148 |

* cited by examiner

*Primary Examiner*—Charles T. Jordan
*Assistant Examiner*—Elizabeth Shaw
(74) *Attorney, Agent, or Firm*—Collard & Roe, P.C.

(57) ABSTRACT

A horseshoe with spikes and a method for making the spikes. The horseshoe has a ground engaging surface provided with first and second series of substantially parallel V-shaped grooves. The first series of substantially parallel V-shaped grooves define a first series of axes and the second series of substantially parallel V-shaped grooves define a second series of axes intersecting the first series of axes at an angle, thereby defining a plurality of pyramid-like spikes on the at least one portion of the ground engaging surface.

18 Claims, 9 Drawing Sheets

HORSESHOE WITH SPIKES AND METHOD FOR MAKING THE SPIKES

CROSS REFERENCE TO RELATED APPLICATIONS

Applicant claims priority under 35 U.S.C. §119(e) (i) and the benefit of U.S. Provisional Application Ser. No. 60/367,755 filed Mar. 28, 2002.

FIELD OF THE INVENTION

The present invention relates to a horseshoe that improves the traction of a horse, particularly in icy or snowy conditions.

BACKGROUND OF THE INVENTION

As is known in the art, a conventional horseshoe is made of a metallic material which is attached to the bottom surface of the horse's hoof by a plurality of nails. The horseshoe has a hoof engaging surface that is relatively flat. On its other side, the horseshoe has a ground engaging surface that is of a generally convex configuration. Over the years, some horseshoe constructions have been proposed for improving the traction of the horse on slippery surfaces, more particularly surfaces such as packed snow or ice. The most conventional and widely used so far is the horseshoe provided with about four sharp spikes. These four spikes are rather large and extend substantially beyond the ground engaging surface of the horseshoe. However, this type of horseshoe does not provide a suitable grip, especially when the horse is running. Injuries to muscles, nerves or tendons are often caused by falls that may in turn be caused by the use of improper horseshoes. Also, if the horse does not feel safe because it may slip, due to the use of improper horseshoes for example, it is not capable of working or running with a maximum force. This may be an important factor during a race for example.

Known in the art, there are the following U.S. patent documents which disclose different types of horseshoes: U.S. Pat. Nos. 4,420,046 (CHOPLIN); 4,878,541 (PEDERSEN); 4,889,188 (ANDERSON); 5,158,143 (CAMPBELL); 5,172,766 (ADKINS); 5,205,362 (NOFFSINGER); and U.S. Design Pat. No. 367,739 (FOX et al.). However, these documents disclose horseshoes that are relatively complicated to manufacture, require several components and/or do not properly solve all the problems identified above in a simple manner.

Accordingly, there is a need in the art for a horseshoe with improved gripping capabilities, and which is relatively simple and inexpensive to manufacture.

SUMMARY OF THE INVENTION

It is an object of the present invention to provide a horseshoe having a better gripping capability that the ones known in the art and that is relatively inexpensive to manufacture.

It is another object of the present invention to provide a method for making spikes in a horseshoe to improve its gripping capability and which is relatively inexpensive to make.

According to the present invention, there is provided a horseshoe comprising:

a hoof engaging surface; and a ground engaging surface having first and second series of substantially parallel V-shaped grooves on at least one portion of the ground engaging surface, the first series of substantially parallel V-shaped grooves defining a first series of axes, the second series of substantially parallel V-shaped grooves defining a second series of axes intersecting the first series of axes at an angle, thereby defining a plurality of pyramid-like spikes on said at least one portion of the ground engaging surface.

According to another aspect of the present invention, there is provided a method for making a plurality of spikes in a horseshoe having a hoof engaging surface and a ground engaging surface, the method comprising the steps of:

i) machining a first series of substantially parallel V-shaped grooves on at least one portion of the ground engaging surface, the first series of substantially parallel V-shaped grooves defining a first series of axes; and ii) machining a second series of substantially parallel V-shaped grooves on said at least one portion of the ground engaging surface, the second series of substantially parallel V-shaped grooves defining a second series of axes intersecting the first series of axes at an angle, thereby defining a plurality of pyramid-like spikes on said at least one portion of the ground engaging surface.

Preferably, the horseshoe comprises about 9 to 36 small pyramid-like spikes per square inch and may be provided with an average of 100 to 150 small pyramid-like spikes on the entire or most of the ground engaging surface.

Preferably, the pyramid-like spikes are provided only on selected portions of the horseshoe, with other selected portions of the horseshoe being provided with a single series of parallel V-shaped grooves and/or with other selected portions of the horseshoe being provided with no grooves at all.

The invention as well as its numerous advantages will be better understood by reading of the following non-restrictive description of preferred embodiments made in reference to the appending drawings.

DETAILED DESCRIPTION OF THE INVENTION

Figure 1:
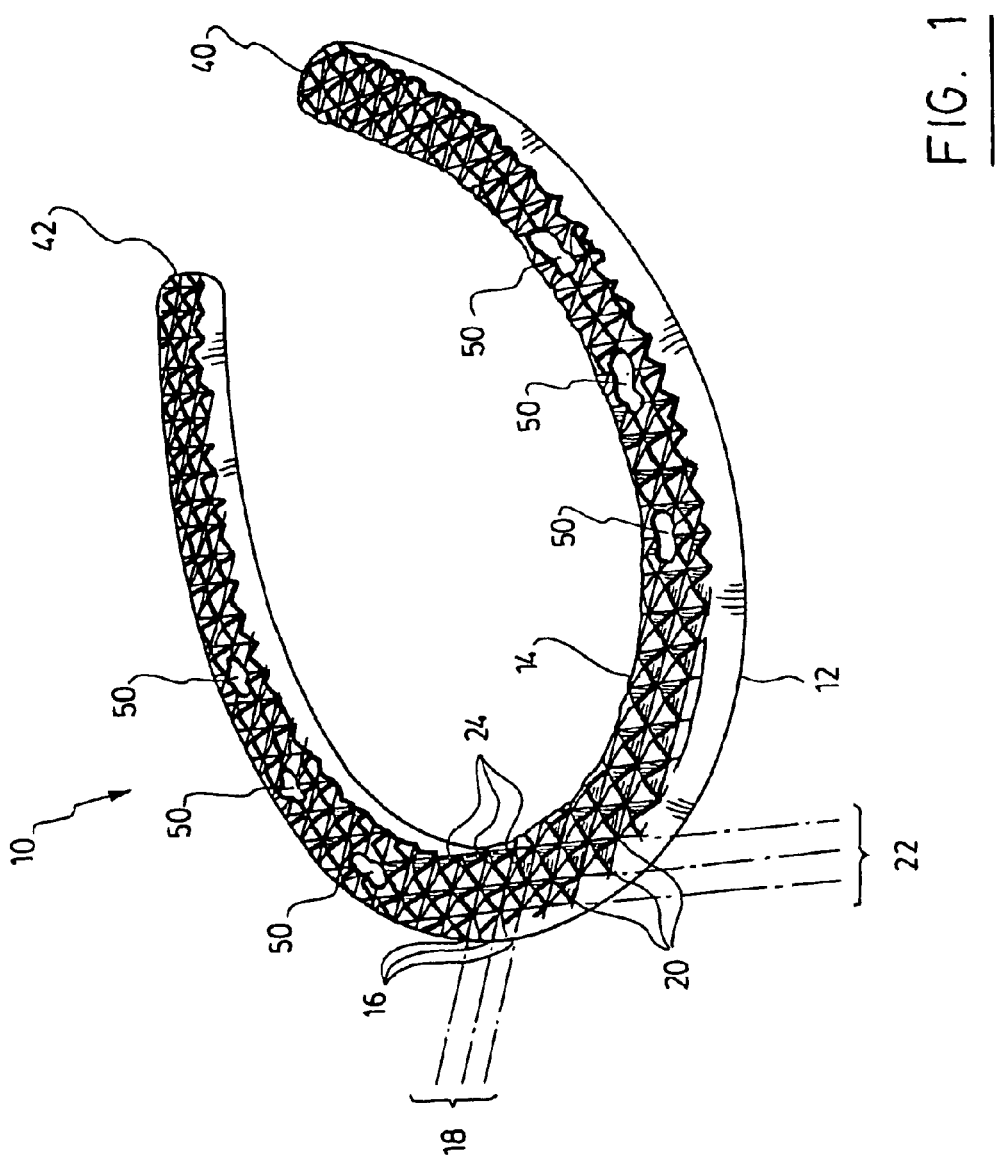
FIG. 1 is a perspective view of a horseshoe being provided throughout with pyramid-like spikes on its ground engaging surface according to a first preferred embodiment of the present invention.

Referring to FIGS. 1 to 9, there are shown four types of horseshoes 10 according to preferred embodiments of the present invention. Each horseshoe 10 includes a hoof engaging surface 12 and a ground engaging surface 14. The ground engaging surface 14 has first and second series of substantially parallel V-shaped grooves 16, 20 on at least one portion of the ground engaging surface 14. The first series of substantially parallel V-shaped grooves 16 define a first series of axes 18 and the second series of substantially parallel V-shaped grooves 20 define a second series of axes 22 intersecting the first series of axes 18 at an angle, which defines a plurality of pyramid-like spikes 24 on the at least one portion of the ground engaging surface 14.

Those skilled in the art will understand that the exact shape of the V-shaped grooves 16, 20 may vary somewhat with respect to what is shown in the drawings.

The purpose of the V-shaped grooves 16, 20 is to form the pyramid-like spikes 24 which provide the improved gripping. In fact, the actual shape of the resulting pyramid-like spikes 24 may vary depending on the spacing between the V-shaped grooves 16, 20, the steepness of the walls forming the V-shaped grooves 16, 20, and the angle that is defined between the fist and second series of axes 18, 22.

In order to provide an increased traction, it is preferable that the pyramid-like spikes 24 be as sharp as possible. However, the top of the pyramid-like spikes 24 may be somewhat flat and still provide suitable gripping capabilities. The V-shaped grooves 16, 20 may be shaped substantially symmetrical to each other, but many variations may be effected thereto. For example, it is possible to have asymmetrical V-shape grooves and the spacing between series of V-shaped grooves need not to be constant.

The pyramid-like spikes 24 of the horseshoes 10 shown in the accompanying Figures may be made by machining a conventional horseshoe with any suitable tool as those skilled in the art will understand. According to the present invention, a method for making spikes in a horseshoe 10 having a ground engaging surface essentially comprises the steps of:

i) machining a first series of substantially parallel V-shaped grooves 16 on at least one portion of the ground engaging surface 14, the first series of substantially parallel V-shaped grooves 16 defining a first series of axes 18; and ii) machining a second series of substantially parallel V-shaped grooves 20 on the at least one portion of the ground engaging surface, the second series of substantially parallel V-shaped grooves defining a second series of axes 22 intersecting the first series of axes 18 at an angle, thereby defining a plurality of pyramid-like spikes 24 on the at least one portion of the ground engaging surface 14.

As those skilled in the art will understand, the spikes 24 provided on the horseshoe 10 according to the present invention may also be formed when originally casting and molding the horseshoe instead of being machined directly thereon as described above. Indeed, any suitable mold may be used to manufacture the horseshoes 10 that are shown in the accompanying Figures or other possible embodiments according to the invention. Nevertheless, the method for machining the horseshoe disclosed above provides the advantage of being relatively inexpensive and does not require the use of special molds that are quite expensive.

Figure 2:
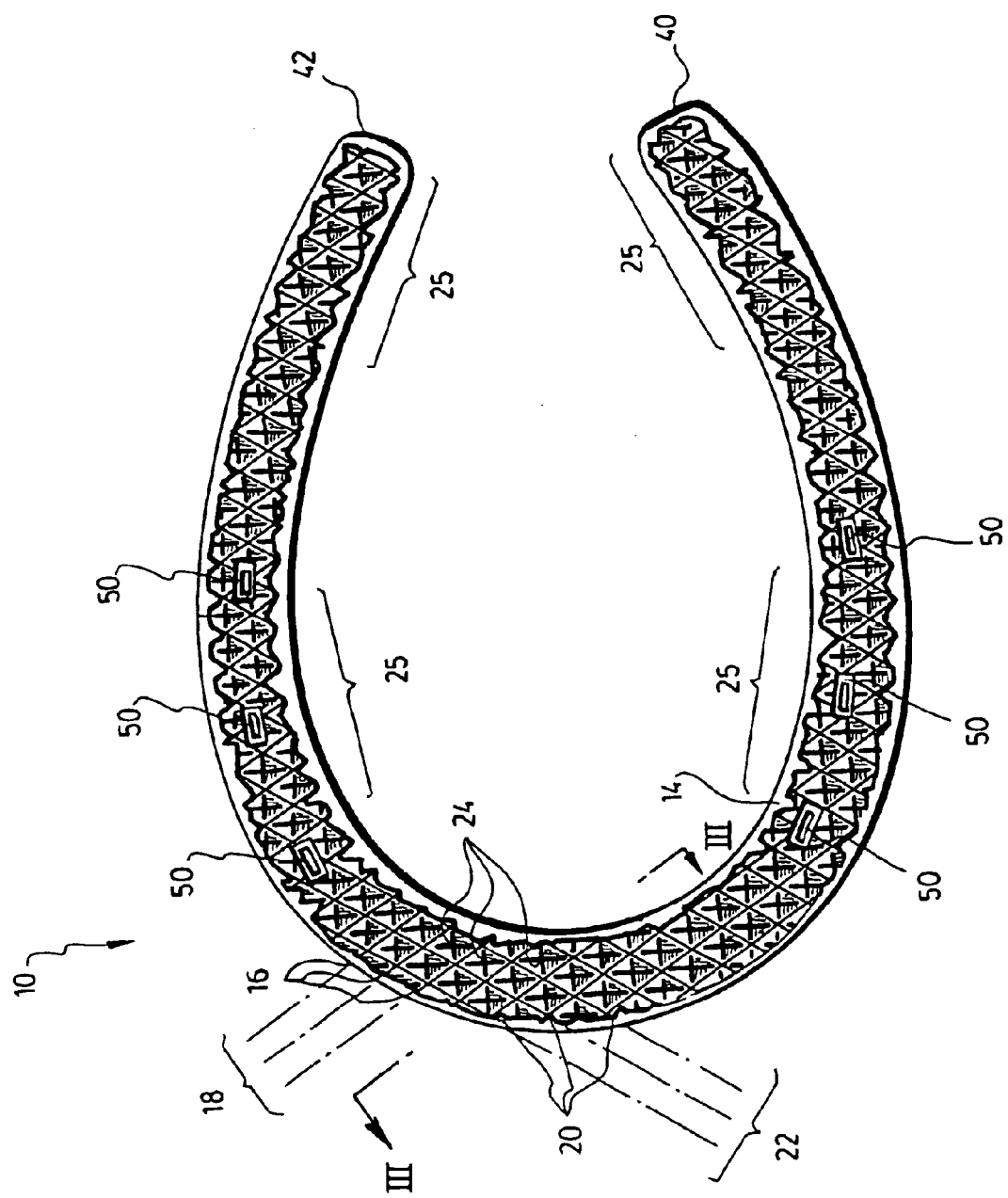
FIG. 2 is a bottom view of the horseshoe shown in FIG. 1.
Figure 3:
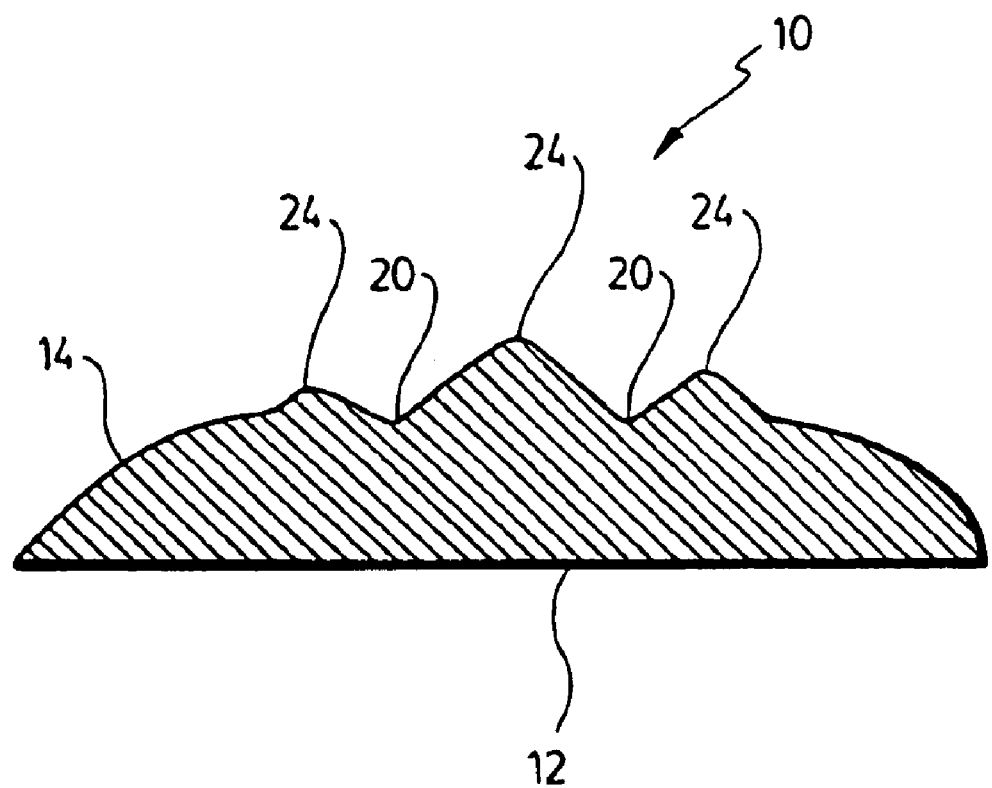
FIG. 3 is a cross-sectional view taken along line III–III of FIG. 2.

Referring now to FIGS. 1 to 3, there is shown a horseshoe 10 according to a first preferred embodiment of the present invention. The ground engaging surface 14 of the horseshoe 10 is provided with first and second series of substantially parallel V-shaped grooves 16, 20 that may be machined directly throughout the entire surface of the ground engaging surface 14. As illustrated, the angle formed by the intersection of the two series of axes 18, 22 may be an angle larger than 90 degrees.

Referring to FIG. 3, there is shown a more detailed view of the pyramid-like spikes 24 that are defined between the two series of V-shaped grooves 16, 20. The tips of the pyramid-like spikes 24 preferably extend the same distance from the hoof-engaging surface 14. Preferably, there are defined about 9 to 12 or 36 small pyramid-like spikes per square inch, which corresponds to an average of 100 or 105 to 140 or 150 spikes for a single horseshoe.

It is to be noted that some selected portions, shown by reference character 25 in FIG. 2 may not provided with the pyramid-like spikes 24. Such kind of horseshoe (not shown) is particularly adapted to be used for racehorses.

Figure 4:
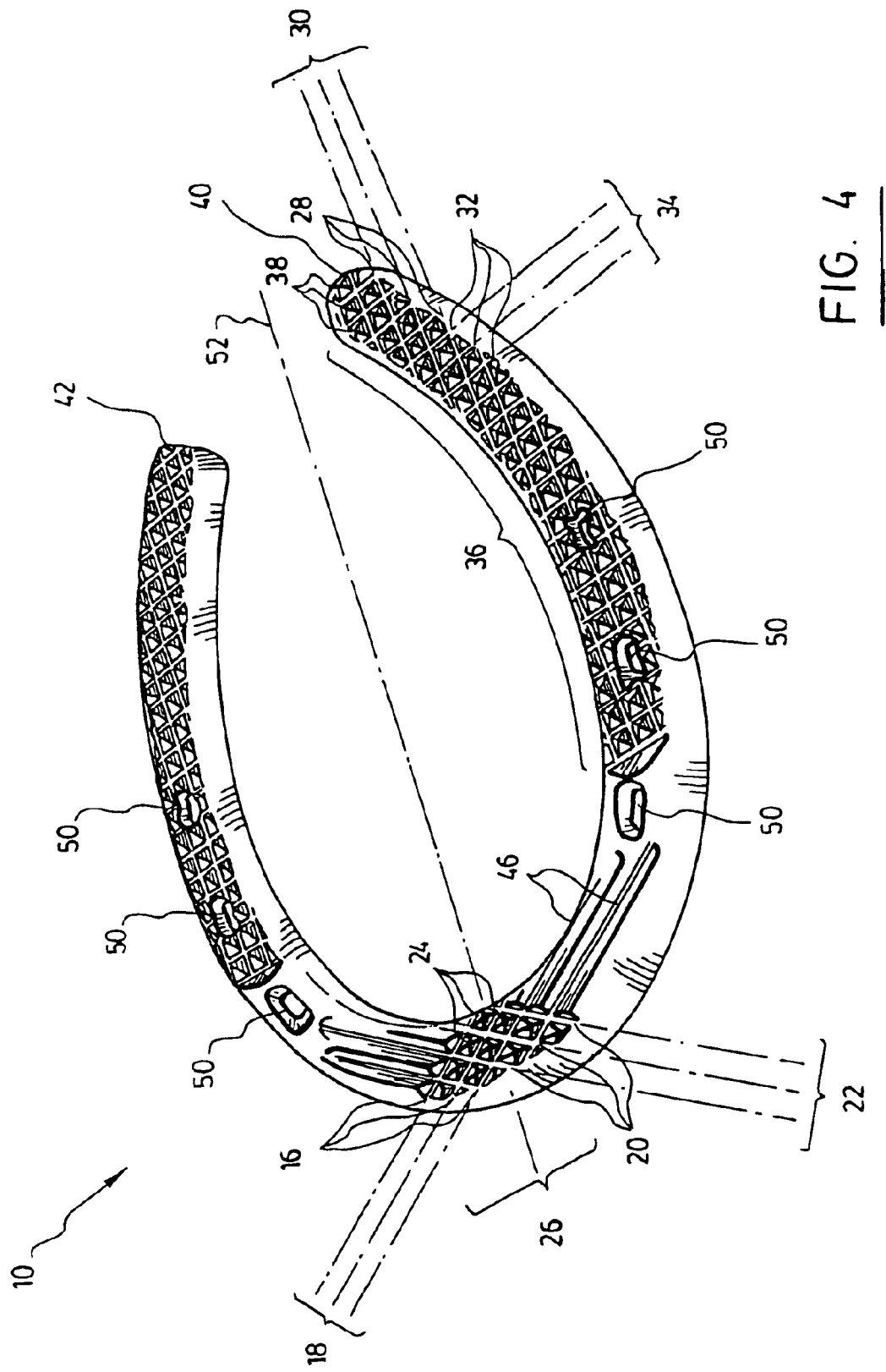
FIGS. 4 to 9 are respective perspective and bottom views of horseshoes according to a second, third and fourth preferred embodiments of the present invention.
Figure 5:
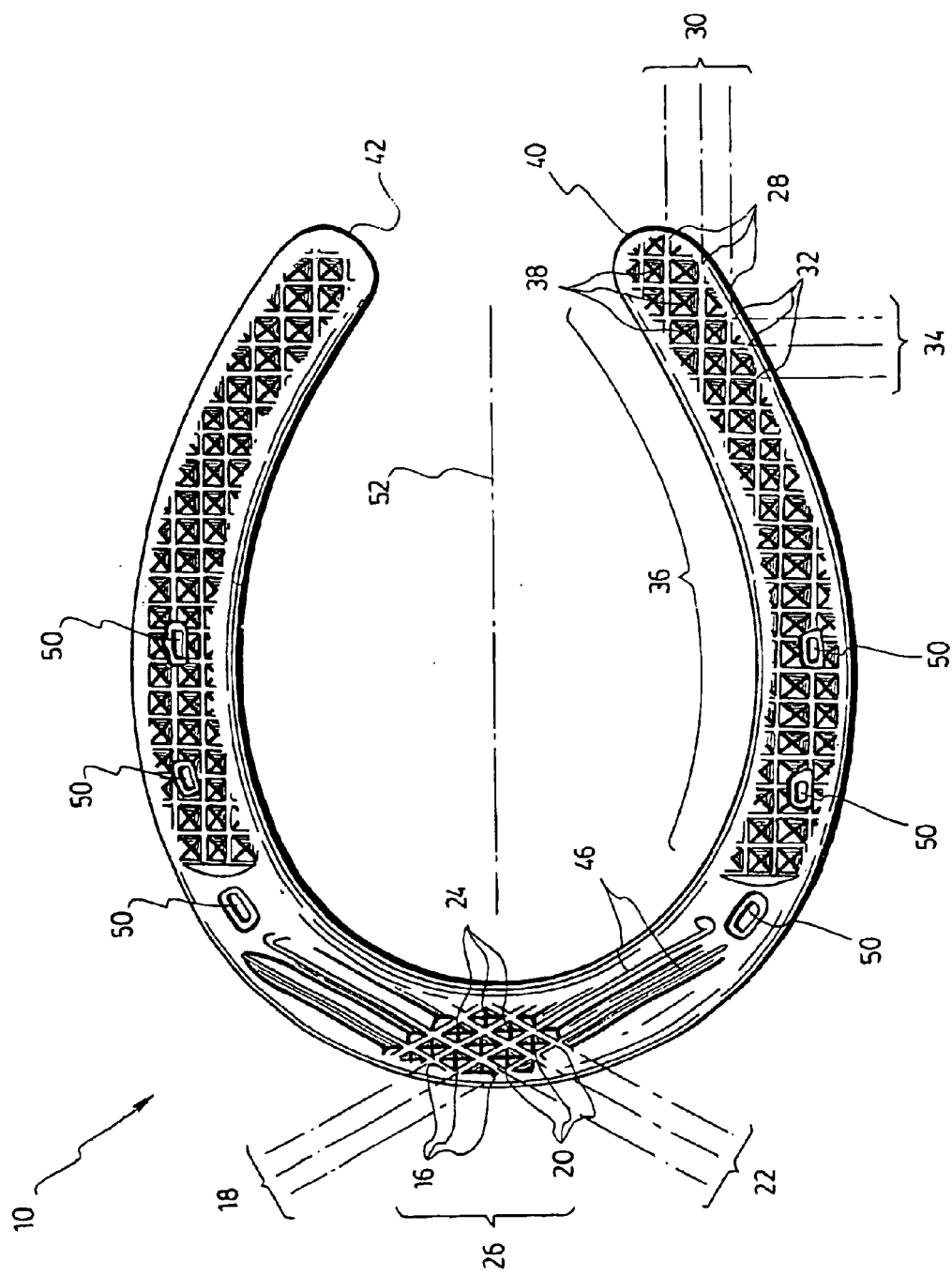

Referring now to FIGS. 4 and 5, there is shown another horseshoe 10 according to a second preferred embodiment of the present invention. This horseshoe 10 is also particularly adapted to be used for racehorses. In this horseshoe 10, a central portion 26 of the ground engaging surface 14 is provided with the first and second series of V-shaped grooves 16, 20 defining the pyramid-like spikes 24.

Furthermore, the ground engaging surface 14 includes third and fourth series of substantially parallel V-shaped grooves 28, 32 on at least one lateral leg portion 36 of the ground engaging surface 14. The third series of substantially parallel V-shaped grooves 28 define a third series of axes 30 and the second series of substantially parallel V-shaped grooves 32 define a fourth series of axes 34 intersecting the third series of axes 32 at another angle, thereby defining another plurality of pyramid-like spikes 38 on the at least one lateral leg portion 36 of the ground engaging surface 14. As illustrated, the other angle formed by the intersection of the two series of axes 30, 34 is an orthogonal angle. Of course, this other angle may be the same as the angle defined by the intersection of the first and second series of axes 18, 22. The lateral leg portion 36 of the ground engaging surface 14 may be located on either a right leg portion 40 or left leg portion 42 of the horseshoe 10. In this case, the horseshoe 10 has a symmetrical configuration on both sides of a longitudinal axis 52 and therefore the third and fourth series of V-shaped grooves 28, 32 are present on both right and left leg portions 40, 42.

Furthermore, in the horseshoe 10 that is illustrated in FIGS. 4 and 5, the first series of substantially parallel V-shaped grooves 16 extend beyond the central portion 26, thereby defining a first plurality of longitudinal spikes 46. Similarly, because this horseshoe is symmetrical, the second series of substantially parallel V-shaped grooves 20 may also extend beyond the central portion 26 on the other side, thereby defining another plurality of longitudinal spikes. Compared to the horseshoe 10 of FIG. 1, the horseshoe 10 shown in FIGS. 4 and 5 loosens the front grip a bit while maintaining the sides with the same grip.

Figure 6:
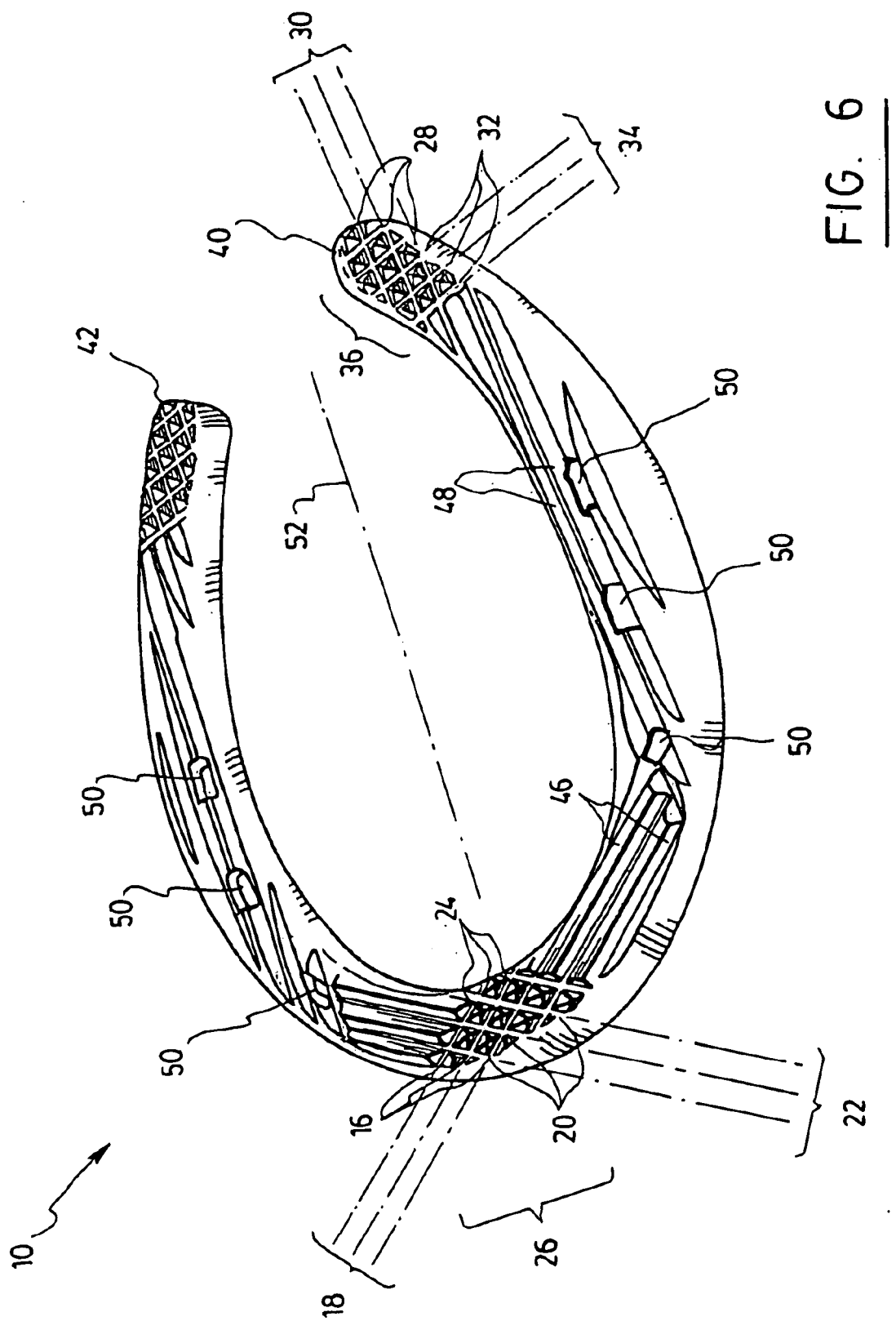
Figure 7:
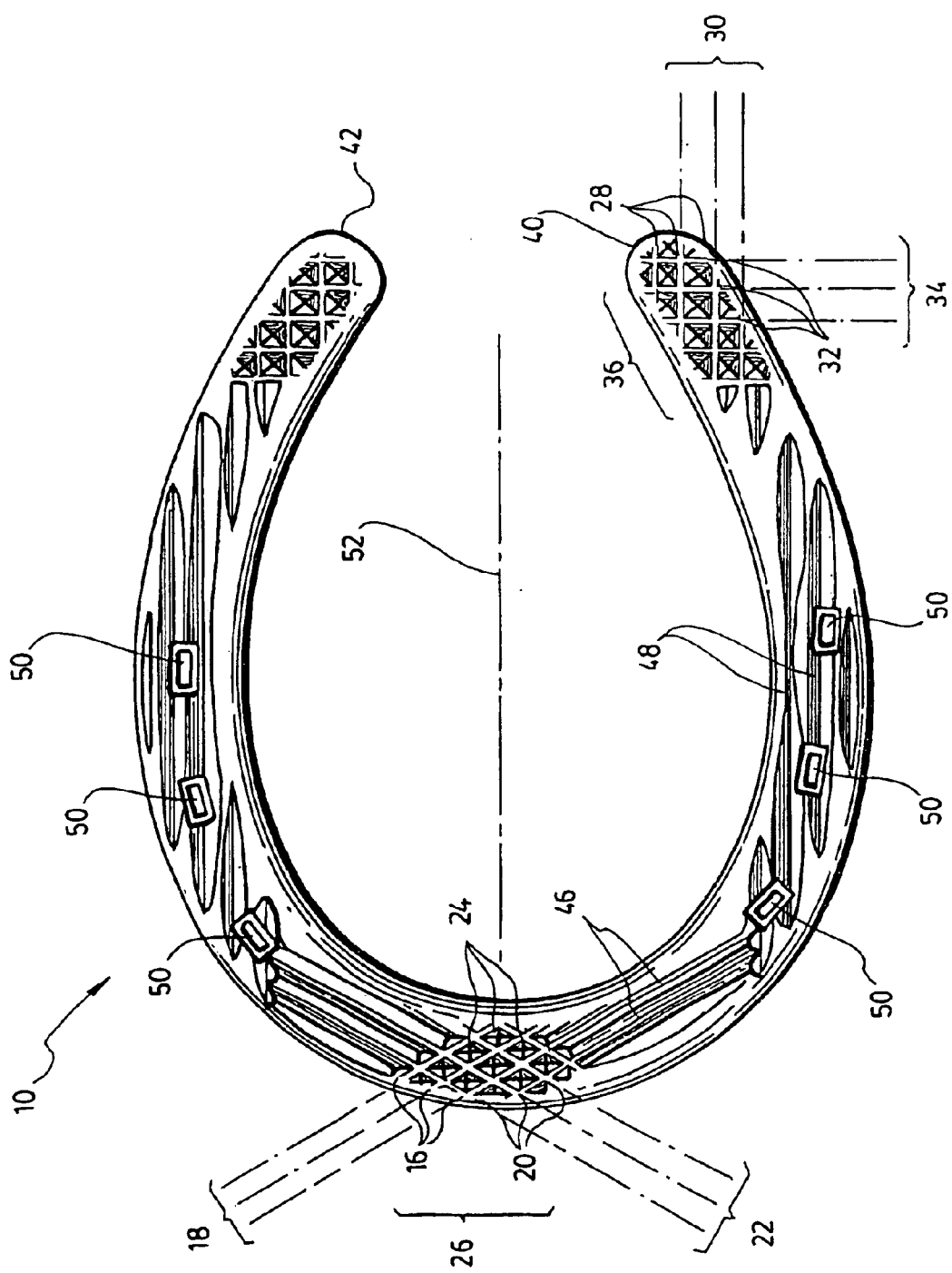

Referring to FIGS. 6 and 7, there is shown another horseshoe 10 for a racehorse according to a third preferred embodiment of the present invention. This horseshoe 10 has a smaller central portion 26 and a smaller lateral portion 36, which respectively define the pyramid-like spikes 24, 38. In this embodiment, the third series of substantially parallel V-shaped grooves 28 extend beyond the lateral leg portion 36 along the third axes 30, thereby defining a second plurality of longitudinal spikes 48. This horseshoe 10 is also symmetrical about its longitudinal axis 52. Compared to the horseshoe 10 shown in FIG. 4, this configuration loosens the side and part of the front grip even more.

As those skilled in the art will understand, other selected portions of the horseshoe 10 may be provided with a single series of parallel V-shaped grooves to create similar longitudinal spikes 46, 48 as the ones illustrated in FIG. 6. In fact, the longitudinal spikes do not need to be the extensions of the first and third series of V-shaped grooves 16, 28, and can be oriented differently.

Furthermore, other numerous possible configurations (not shown) may be conceived with respect to the actual location of the V-shaped grooves 24, 38 on the ground engaging surface 14. For example, a horseshoe may have pyramid-like spikes on a leg portion and a central portion and the other leg portion may be provided with a single series of parallel V-shaped grooves. This configuration loosens the grip on the side provided with only the single series of parallel grooves. Also, one of the leg portions may be provided with no V-shaped grooves to loosen the grip on that side even more. As those skilled in the art will understand, different combinations may be effected depending on the particular needs of the horse.

Figure 8:
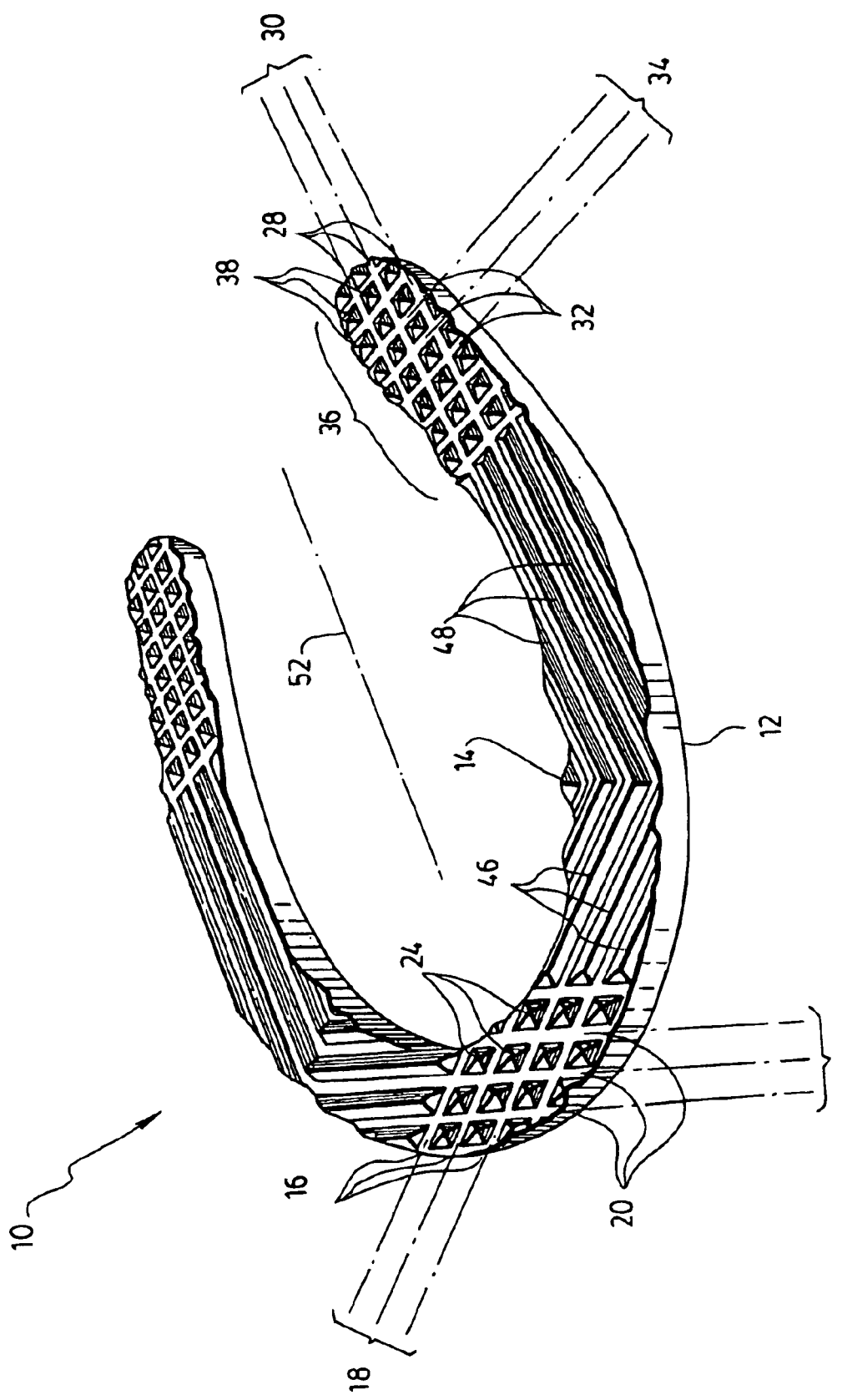
Figure 9:
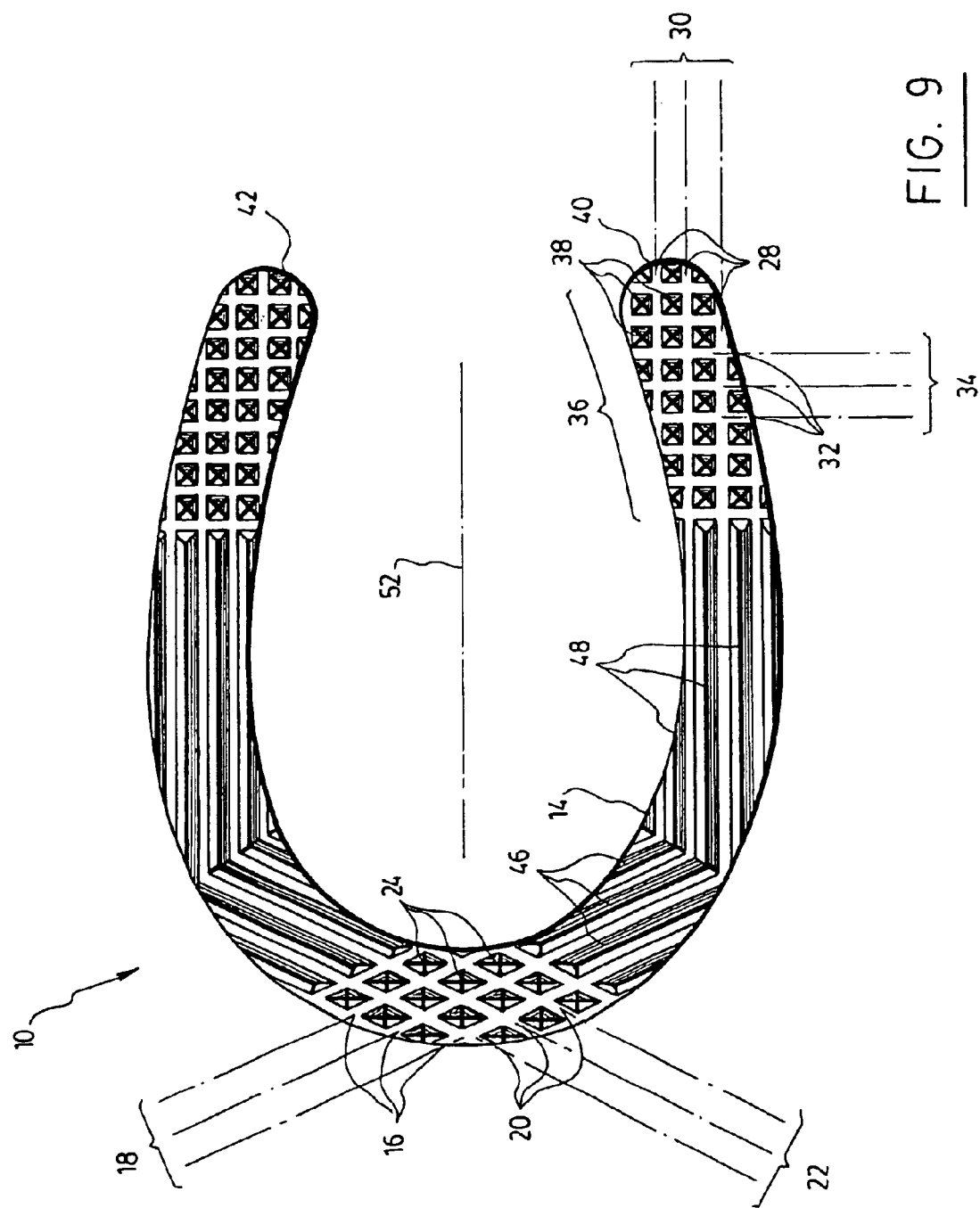

Referring to FIGS. 8 and 9, there is shown a another horseshoe 10 according to a fourth preferred embodiment of the present invention. This horseshoe 10 is similar to the one shown in FIGS. 6 and 7, but it is made of aluminum, whereas the other horseshoes are made of steel, iron or any suitable metal. This type of horseshoe is therefore more lighter. Preferably, to increase its strength and durability, all the pyramid-like spikes 24, 38 are anodized.

Preferably, with reference to FIGS. 4 and 5, the method for forming the spikes as described above on a conventional horseshoe further comprises the steps of:

iii) machining a third series of substantially parallel V-shaped grooves 28 on at least one lateral leg portion 36 of the ground engaging surface 14, the third series of substantially parallel V-shaped grooves 28 defining a third series of axes 30; and iv) machining a fourth series of substantially parallel V-shaped grooves 32 on the at least one lateral leg portion 36 of the ground engaging surface 14, the second series of substantially parallel V-shaped grooves 32 defining a fourth series of axes 34 intersecting the third series of axes 30 at another angle, thereby defining another plurality of pyramid-like spikes 38 on the at least one lateral leg portion 36 of the ground engaging surface 14.

Referring to FIGS. 6 to 9, the above method further includes the step of machining the first series of substantially parallel V-shaped grooves 16 beyond the central portion 26 along the first series of axes 18, thereby defining a first plurality of longitudinal spikes 46. The method may further include the step of machining the third series of substantially parallel V-shaped grooves 28 beyond the lateral leg portion 36 along the third series of axes 30, thereby defining a second plurality of longitudinal spikes 48.

Referring back to FIGS. 1 to 7, the horseshoes 10 may already be provided with nail receiving holes 50 for attaching the horseshoe 10 to a hoof of a horse, such as in the case of horseshoes that are made of iron. In case of the horseshoe 10 shown in FIGS. 8 and 9, which is made of aluminum, the holes may be made at a later time. Alternatively, the aluminum horseshoe may be glued or adhered to the horse's hoof. Other variations with regard to the attaching of the horseshoe to the horse's hoof are well within the scope of those skilled in the art.

As the Applicant has discovered, every horse has a particular way of walking and running, hence each horse must be individually fitted with a suitable horseshoe depending on its needs. The use of the horseshoes according to the present invention has drastically improved the useful life of many horses which were though to be finished after suffering an injury for example.

Furthermore, a series of tests have been conducted on a racetrack under conditions where the track was covered with ice. The horses with horseshoes according to the present invention were found to perform very well and to move with greater confidence than the ones having the prior art horseshoes with four spikes.

The horseshoe according to the present invention may be used with any kind of horse, namely racing horses, riding horses, young or old, etc.

The spikes of the horseshoe according to the present invention may be tempered to improve their durability. They are also less subject to premature wear than the conventional horseshoe with four spikes.

Another important advantage of the present invention is that the horseshoe may be used during the four seasons and under any condition that may cause a risk of slipping, such as rain, mud, ice, snow, etc. Using the same horseshoe during all seasons reduces the operating costs because the services of the blacksmith will be less frequent.

Yet another important advantage of the present invention is that use of the horseshoe according to the present invention may avoid fractures, tendinitis or sprains to horses that are otherwise caused by the known horseshoes.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A horseshoe comprising:

a hoof engaging surface; and a ground engaging surface having first and second series of substantially parallel V-shaped grooves on at least one portion of the ground engaging surface, the first series of substantially parallel V-shaped grooves defining a first series of axes, the second series of substantially parallel V-shaped grooves defining a second series of axes intersecting the first series of axes at an angle, thereby defining a plurality of pyramid-like spikes on said at least one portion of the ground engaging surface;

wherein said at least one portion of the ground engaging surface is located in a central portion of the ground engaging surface, and the ground engaging surface further comprises third and fourth series of substantially parallel v-shaped grooves on at least one lateral leg portion of the ground engaging surface, the third series of substantially parallel v-shaped grooves defining a third series of axes, the second series of substantially parallel V-shaped grooves defining a fourth series of axis intersecting the third series of axis at another angle, thereby defining another plurality of pyramid-like spikes on said at least one lateral leg portion of the ground engaging surface.

2. The horseshoe according to claim 1, wherein said at least one portion of the ground engaging surface is provided with 9 to 36 pyramid-like spikes per square inch.

3. The horseshoe according to claim 2, wherein the first and second series of substantially parallel V-shaped grooves are provided on an entire surface of the ground engaging surface and the ground engaging surface is provided with 100 to 150 pyramid-like spikes.

4. The horseshoe according to claim 1, wherein said at least one lateral leg portion of the ground engaging surface is located on right and left leg portions of the horseshoe.

5. The horseshoe according to claim 1, wherein the first series of substantially parallel V-shaped grooves extend beyond the central portion along the first series of axes, thereby defining a first plurality of longitudinal spikes.

6. The horseshoe according to claim 5, wherein the third series of substantially parallel V-shaped grooves extend beyond the lateral leg portion along the third series of axes, thereby defining a second plurality of longitudinal spikes.

7. The horseshoe according to claim 1, wherein the horseshoe is made of iron and the pyramid-like spikes are tempered.

8. The horseshoe according to claim 1, wherein the horseshoe is made of aluminum and the pyramid-like spikes are anodized.

9. The horseshoe according to claim 1, wherein the horseshoe is provided with nail receiving holes for attaching the horseshoe to a hoof of a horse.

10. A method for making a plurality of spikes in a horseshoe having a hoof engaging surface and a ground engaging surface, the method comprising the steps of:
   i) machining a first series of substantially parallel V-shaped grooves on at least one portion of the ground engaging surface, the first series of substantially parallel V-shaped grooves defining a first series of axes;
   ii) machining a second series of substantially parallel V-shaped grooves on said at least one portion of the ground engaging surface, the second series of substantially parallel V-shaped grooves defining a second series of axes intersecting the first series of axes at an angle, thereby defining a plurality of pyramid-like spikes on said at least one portion of the ground engaging surface;
   wherein, if said steps i) and ii), said at least one portion of the ground engaging surface is located in a central portion of the ground engaging surface;
   iii) machining a third series of substantially parallel V-shaped grooves on at least one lateral leg portion of the ground engaging surface, the third series of substantially parallel v-shaped grooves defining a third series of axes; and
   iv) machining a fourth series of substantially parallel V-shaped grooves on said at least one lateral leg portion of the ground engaging surface, the second series of substantially parallel v-shaped grooves defining a fourth series of axes intercepting the third series of axes at another angle, thereby defining another plurality of pyramid-like spikes on said at least one lateral portion of the ground engaging surfaces.

11. The method according to claim 10, wherein the plurality of pyramid-like spikes that are defined in step ii) on said at least one portion of the ground engaging surface comprises between 9 to 36 pyramid-like spikes per square inch.

12. The method according to claim 10, further comprising the step of machining the first and second series of substantially parallel V-shaped grooves on an entire surface of the ground engaging surface to thereby define the plurality of pyramid-like spikes on the entire face of the ground engaging surface.

13. The method according to claim 12, wherein the plurality of pyramid-like spikes on the entire face of the ground engaging surface comprises between 100 to 150 pyramid-like spikes.

14. The method according to claim 10, wherein said at least one lateral leg portion of the ground engaging surface is located on right and left leg portions of the horseshoe.

15. The method according to claim 10, wherein said at least one lateral leg portion of the ground engaging surface is located on a right leg portion of the horseshoe.

16. The method according to claim 10, wherein said at least one lateral leg portion of the ground engaging surface is located on a left leg portion of the horseshoe.

17. The method according to claim 10, wherein step i) further comprises the step of machining the first series of substantially parallel V-shaped grooves beyond the central portion along the first series of axes, thereby defining a first plurality of longitudinal spikes.

18. The method according to claim 17, wherein step iii) further comprises the step of machining the third series of substantially parallel V-shaped grooves beyond the lateral leg portion along the third series of axes, thereby defining a second plurality of longitudinal spikes.

* * * * *